US011188129B2

(12) United States Patent
Lin et al.

(10) Patent No.: US 11,188,129 B2
(45) Date of Patent: Nov. 30, 2021

(54) EXPANSION HINGE AND ELECTRONIC DEIVCE HAVING THE SAME

(71) Applicants: Che-Hsien Lin, Taipei (TW); Chun-An Shen, Taipei (TW)

(72) Inventors: Che-Hsien Lin, Taipei (TW); Chun-An Shen, Taipei (TW)

(73) Assignee: COMPAL ELECTRONICS, INC., Taipei (TW)

( * ) Notice: Subject to any disclaimer, the term of this patent is extended or adjusted under 35 U.S.C. 154(b) by 100 days.

(21) Appl. No.: 16/697,194

(22) Filed: Nov. 27, 2019

(65) Prior Publication Data
US 2020/0192437 A1 Jun. 18, 2020

Related U.S. Application Data

(60) Provisional application No. 62/781,558, filed on Dec. 18, 2018.

(51) Int. Cl.
*E05D 15/00* (2006.01)
*G06F 1/16* (2006.01)
*H04M 1/02* (2006.01)

(52) U.S. Cl.
CPC ........ *G06F 1/1681* (2013.01); *H04M 1/0216* (2013.01)

(58) Field of Classification Search
CPC .. E05D 3/12; E05D 3/122; E05D 3/06; E05D 3/10; E05D 11/082; E05D 11/087; E05D 2011/085; G06F 1/1681; G06F 1/1616; G06F 1/1618; G06F 1/168; E05Y 2900/606; E05Y 2900/602; H04M 1/0216;
(Continued)

(56) References Cited

U.S. PATENT DOCUMENTS 5,635,928 A * 6/1997 Takagi ................. G06F 1/1616
341/22
8,250,711 B1 * 8/2012 Chen ....................... E05D 15/58
16/354
(Continued)

FOREIGN PATENT DOCUMENTS

CN 202206664 4/2012
TW M545933 7/2017

OTHER PUBLICATIONS

"Office Action of Taiwan Counterpart Application", dated Mar. 31, 2020, p. 1-p. 5.

*Primary Examiner* — Chuck Y Mah
(74) *Attorney, Agent, or Firm* — JCIPRNET

(57) ABSTRACT

An expansion hinge including a torque module, two first brackets, two sliding brackets, two second brackets and two elastic modules is provided. The torque module is configured to provide torques. The two first brackets are rotatably connected to two opposite ends of the torque module. The two sliding brackets are rotatably connected to the two opposite ends of the torque module. The two second brackets are slidably disposed in the two sliding brackets respectively. Each of the two elastic modules is disposed between the respective sliding bracket and the respective second bracket. The two sliding brackets are adapted to synchronously slide with respect to the two second brackets, and each of the elastic modules is configured to push the respective sliding bracket and the respective second bracket to form a pulled-out state or a pushed-in state.

13 Claims, 13 Drawing Sheets

(58) Field of Classification Search
CPC .. H04M 1/0222; H04M 1/022; H05K 5/0226; Y10T 16/547; Y10T 16/541; Y10T 16/545
See application file for complete search history.

(56) References Cited

U.S. PATENT DOCUMENTS

| | | | | |
|---|---|---|---|---|
| 8,385,991 | B2* | 2/2013 | Wang | E05D 3/18 455/575.3 |
| 8,559,623 | B2* | 10/2013 | Chen | G06F 1/1624 379/433.12 |
| 8,776,319 | B1* | 7/2014 | Chang | G06F 1/1681 16/366 |
| 8,831,696 | B2* | 9/2014 | Hsu | G06F 1/1624 455/575.4 |
| 9,540,855 | B2* | 1/2017 | Kato | E05D 11/082 |
| 10,146,266 | B2* | 12/2018 | Shibayama | G06F 1/1618 |
| 10,208,842 | B2* | 2/2019 | Chen | F16H 25/08 |
| 10,856,430 | B2* | 12/2020 | Yoo | G06F 1/1698 |
| 10,901,457 | B2* | 1/2021 | Ou | H04B 1/3827 |
| 2008/0196201 | A1* | 8/2008 | Anderson | B60R 11/0235 16/232 |
| 2008/0250606 | A1* | 10/2008 | Peng | G06F 1/1637 16/353 |
| 2009/0049646 | A1* | 2/2009 | Rubin | H04M 1/0237 16/319 |
| 2012/0175478 | A1* | 7/2012 | Chen | G06F 1/1624 248/286.1 |
| 2012/0217855 | A1* | 8/2012 | Chen | G06F 1/1616 312/323 |
| 2012/0328222 | A1* | 12/2012 | Chen | G06F 1/1681 384/26 |
| 2013/0318746 | A1* | 12/2013 | Kuramochi | G06F 1/1681 16/342 |
| 2014/0223694 | A1* | 8/2014 | Hsu | E05D 7/00 16/302 |
| 2015/0189777 | A1* | 7/2015 | Hsu | E05D 3/12 16/366 |
| 2016/0102487 | A1* | 4/2016 | Kuramochi | G06F 1/1666 361/679.27 |
| 2017/0235337 | A1* | 8/2017 | Vic | E05D 11/00 361/679.55 |
| 2018/0067520 | A1* | 3/2018 | Maatta | G06F 1/1681 |
| 2018/0292863 | A1* | 10/2018 | Escamilla | E05D 11/00 |
| 2020/0080357 | A1* | 3/2020 | Lin | G06F 1/1616 |
| 2020/0097051 | A1* | 3/2020 | Liu | G06F 1/1681 |
| 2020/0117245 | A1* | 4/2020 | Ou | G06F 1/1624 |

\* cited by examiner

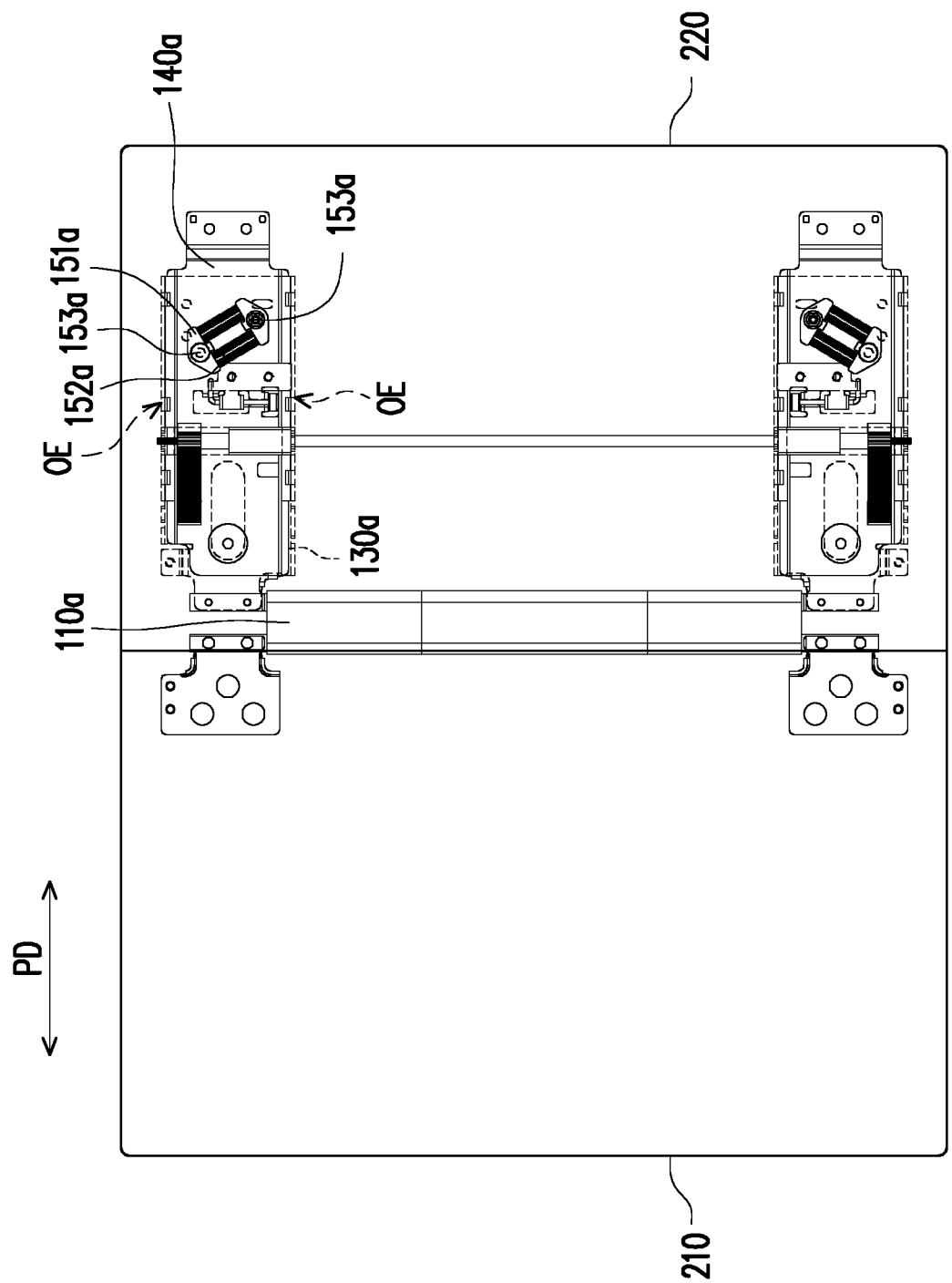

EXPANSION HINGE AND ELECTRONIC DEIVCE HAVING THE SAME

CROSS-REFERENCE TO RELATED APPLICATION

This application claims the priority benefit of U.S. provisional application No. 62/781,558, filed on Dec. 18, 2018. The entirety of the above-mentioned patent application is hereby incorporated by reference herein and made a part of this specification.

TECHNICAL FIELD

The invention relates to a hinge, and more particularly, to an expansion hinge applied in a portable electronic device.

BACKGROUND

Existing portable electronic devices such as smart phones, tablet computers, and notebook computers are becoming more and more popular, and gradually move toward the trend of large screen display. Therefore, smart phones and tablet computers have developed models with dual screens. The dual screens are connected to each other through a hinge, and are adapted to be unfolded from or folded to each other and switched to use in different situations. For example, in an unfolded state, images can be synchronously output through the dual screen to increase a display range of the images. In a folded state, the dual screens are stacked in a up and down manner to reduce the size of the portable electronic device for the user to easily carry or store in the backpack.

However, the existing dual screen electronic devices using the hinge have a large spacing in the unfolded state, which results in a poor viewing of the output image. Also, if a part of the hinge is located in a spacing between the dual screens, the appearance of the unfolded electronic device is less attractive. Accordingly, development on a hinge for improving the shortcomings of the dual screens regarding the overly large spacing and the less attractive appearance has become an important development goal in the field.

SUMMARY

The invention provides an expansion hinge adapted to an electronic device and having a relative sliding effect, which can reduce the spacing between two bodies of the electronic device to achieve a more preferable image displaying effect and an improved appearance.

The expansion hinge of the invention includes a torque module, two first brackets, two sliding brackets, two second brackets and two elastic modules. The torque module is configured to provide torques. The two first brackets are rotatably connected to two opposite ends of the torque module. The two sliding brackets are rotatably connected to the two opposite ends of the torque module. The two second brackets are slidably disposed in the two sliding brackets respectively. Each of the two elastic modules is disposed between the respective sliding bracket and the respective second bracket. The two sliding brackets are adapted to synchronously slide with respect to the two second brackets, and each of the elastic modules is configured to push the respective sliding bracket and the respective second bracket to form a pulled-out state or a pushed-in state. The two first brackets and the two sliding brackets are adapted to rotate relative to the torque module to be folded to each other or unfolded from each other in the pulled-out state.

The electronic device of the invention includes a first body, a second body and an expansion hinge. The expansion hinge is disposed on the first body and the second body, and includes a torque module, two first brackets, two sliding brackets, two second brackets and two elastic modules. The torque module is configured to provide torques. The two first brackets are rotatably connected to two opposite ends of the torque module and fixed to the first body. The two sliding brackets are rotatably connected to the two opposite ends of the torque module. The two second brackets are slidably disposed in the two sliding brackets respectively and fixed to the second body. Each of the two elastic modules is disposed between the respective sliding bracket and the respective second bracket. The two sliding brackets are adapted to synchronously slide with respect to the two second brackets, and each of the elastic modules is configured to push the respective sliding bracket and the respective second bracket to form a pulled-out state or a pushed-in state. In the pulled-out state, the torque module is being pulled out between the first body and the second body so that a distance exists between the first body and the second body, and the first body and the second body are adapted to rotate relative to the torque module to be folded to each other or unfolded from each other. In the pushed-in state, the torque module enters the second body so that the first body and the second body abut each other.

Based on the above, the expansion hinge of the invention utilizes an elastic force released by the two elastic modules during elastic recovery as an auxiliary pushing force, so that the two sliding brackets and the two second brackets have a semi-automatic sliding effect. Then, after the elastic modules are elastically restored, each of the elastic modules is configured to push the respective sliding bracket and the respective second bracket to form the pulled-out state or the pushed-in state of the expansion hinge.

Furthermore, the expansion hinge of the invention is adapted to connect the first body and the second body of the electronic device for outputting images. In the pulled-out state of the expansion hinge, the first body and the second body can rotate relative to the expansion hinge to be folded to each other or unfolded from each other. When the first body and the second body are unfolded from each other by 180 degrees, the two sliding brackets can synchronously slide with respect to the two second brackets by the external force so that the expansion hinge is switched to the pushed-in state. As a result, the torque module can be hidden inside the second body so that the first body and the second body abut each other to reduce the spacing therebetween, and thereby achieve a more image displaying effect and an improved appearance for the electronic device.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIG. 5C is a schematic top view illustrating the electronic device of FIG. 5B in the pushed-in state.

DESCRIPTION OF THE EMBODIMENTS

Figure 1A:
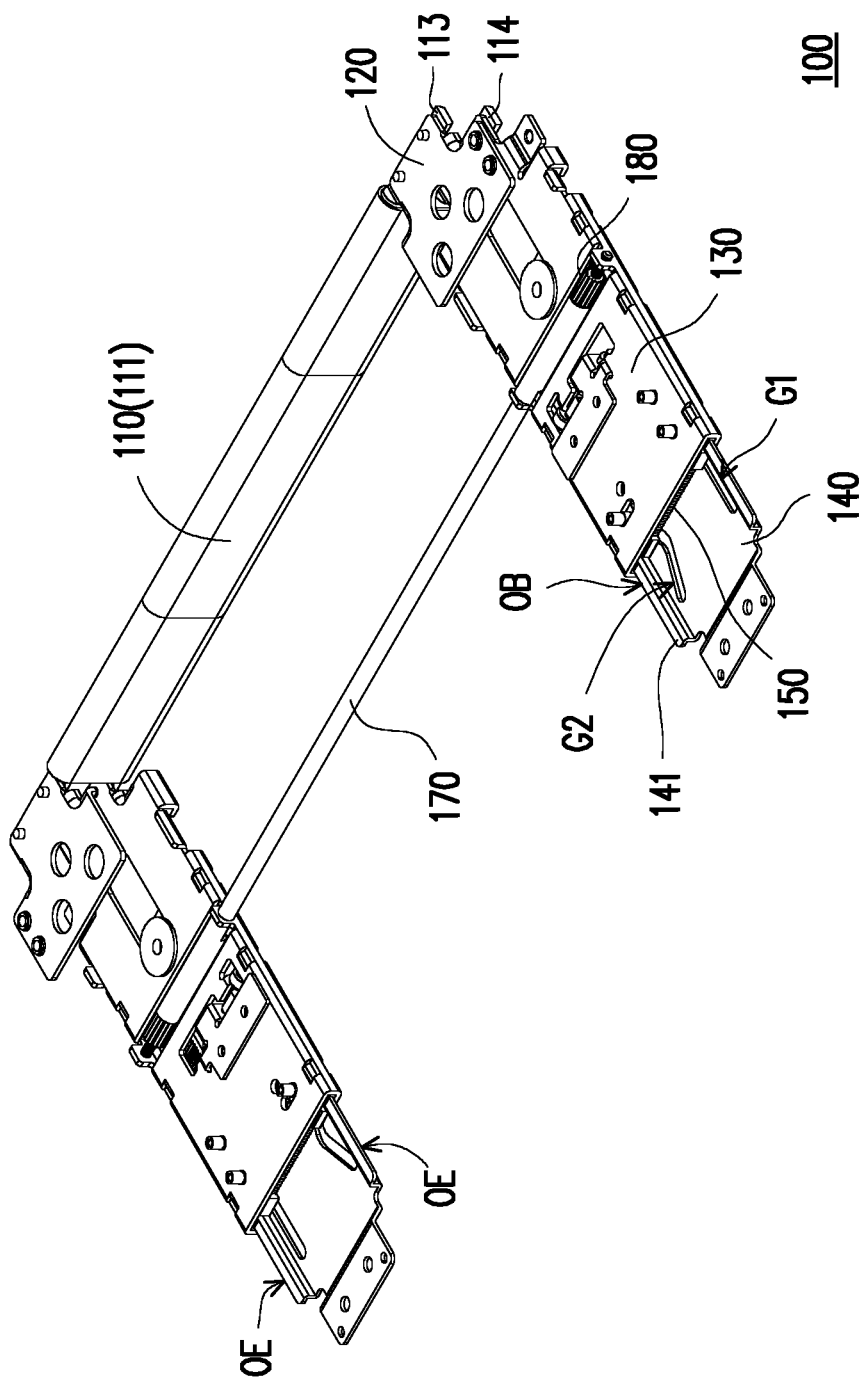
FIG. 1A is a three-dimensional view of an expansion hinge in an embodiment of the invention.

Reference will now be made in detail to the present preferred embodiments of the invention, examples of which are illustrated in the accompanying drawings. Wherever possible, the same reference numbers are used in the drawings and the description to refer to the same or like parts.

Figure 1B:
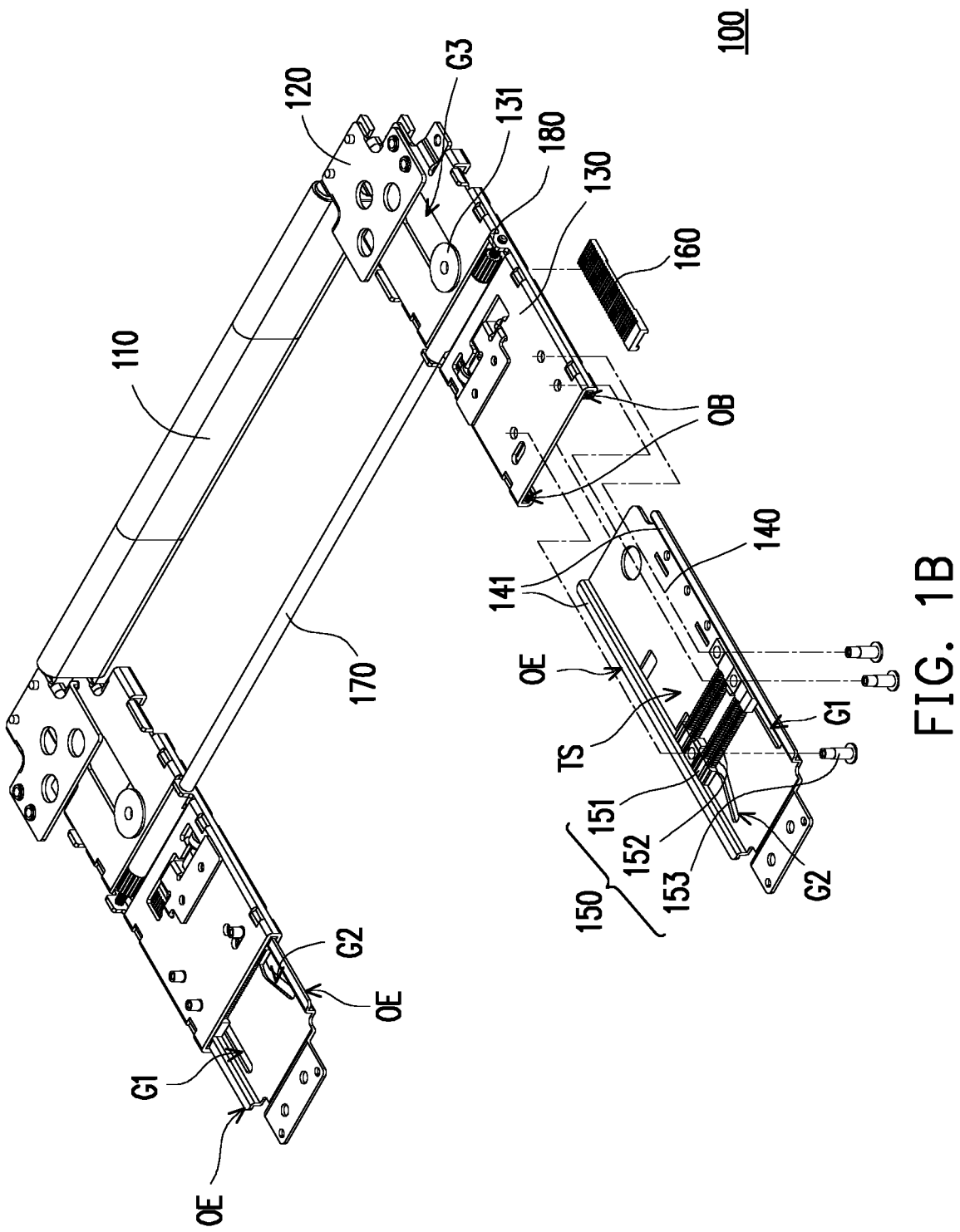
FIG. 1B is a schematic explosion view of certain elements in the expansion hinge of FIG. 1A.
Figure 2A:
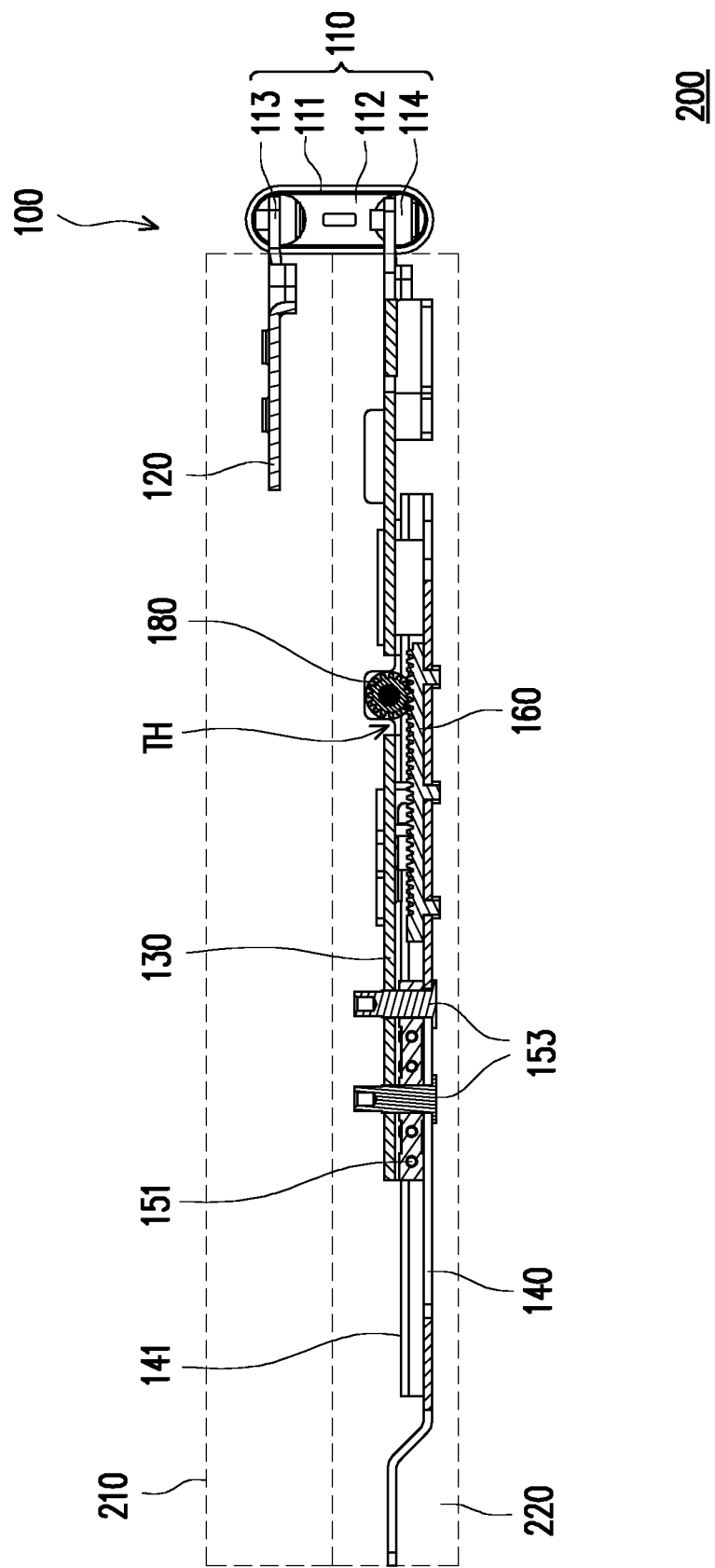
FIG. 2A is a schematic view of an electronic device adopting the expansion hinge in a folded state.
Figure 2B:
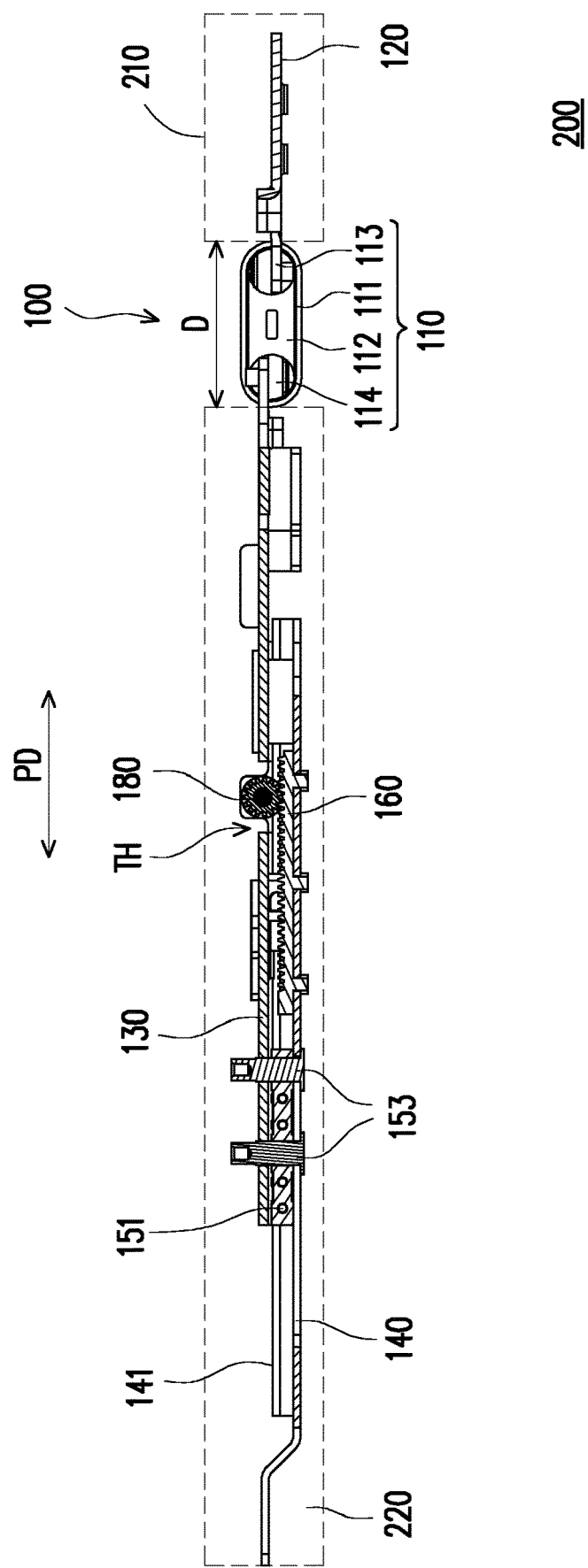
FIG. 2B is a schematic plan view of the electronic device adopting the expansion hinge of FIG. 2A in an unfolded state and a pulled-out state.
Figure 2C:
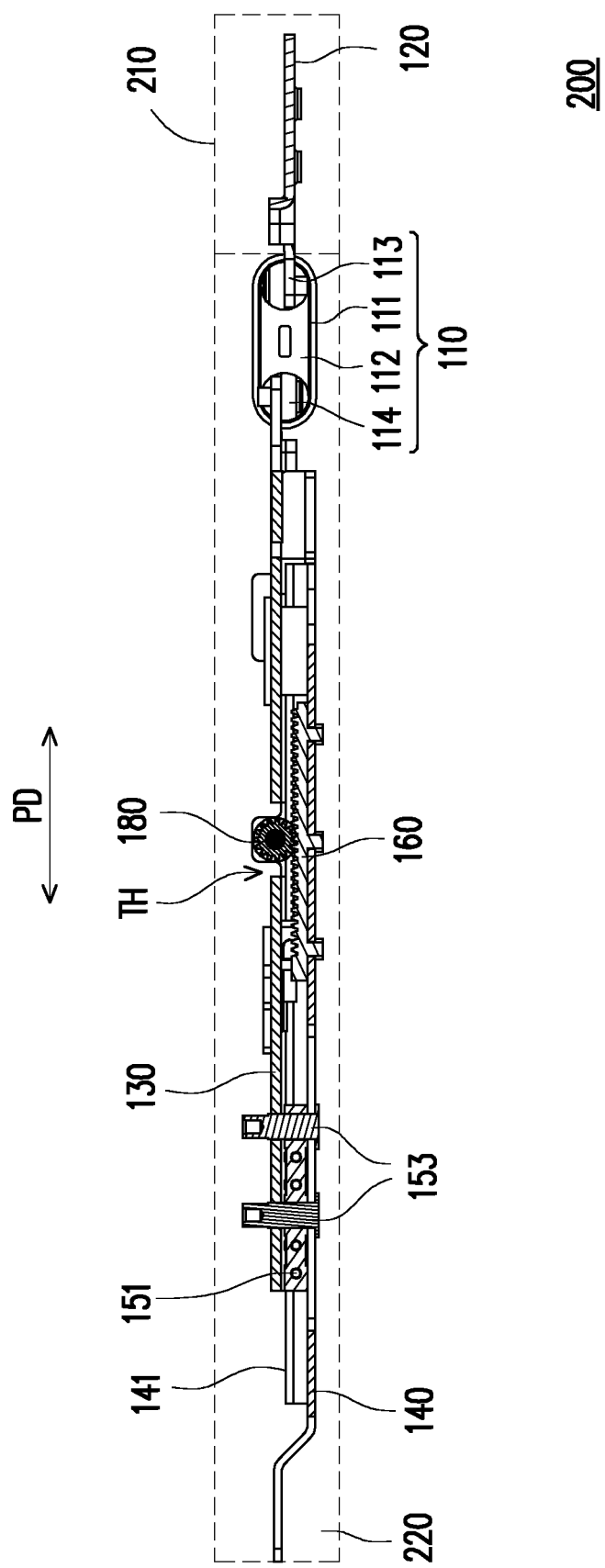
FIG. 2C is a schematic view of the electronic device adopting the expansion hinge switched to a pushed-in state.

FIG. 1A is a three-dimensional view of an expansion hinge in an embodiment of the invention. FIG. 1B is a schematic explosion view of certain elements in the expansion hinge of FIG. 1A. FIG. 2A is a schematic view of an electronic device adopting the expansion hinge in a folded state. FIG. 2B is a schematic plan view of the electronic device adopting the expansion hinge of FIG. 2A in an unfolded state and a pulled-out state. FIG. 2C is a schematic view of the electronic device adopting the expansion hinge switched to a pushed-in state.

The following description refers to FIG. 1A and FIG. 1B. An expansion hinge 100 of the present embodiment includes a torque module 110, two first brackets 120, two sliding brackets 130, two second brackets 140 and two elastic modules 150.

Referring to FIG. 2A to FIG. 2C, the expansion hinge 100 is adapted to an electronic device 200. The electronic device 200 includes a first body 210 and a second body 220. The electronic device 200 is, for example, a notebook computer, a tablet computer or other similar products. In this embodiment, the first body 210 and the second body 220 are, for example, a first screen and a second screen of the tablet computer and respectively disposed on the expansion hinge 100 so the first body 210 and the second body 220 can be switched between the unfolded state and the folded state.

The torque module 110 is configured to provide torques. The two first brackets 120 are rotatably connected to two opposite ends of the torque module 110 and fixed to the first body 210. The two sliding brackets 130 are rotatably connected to the two opposite ends of the torque module 110. The two second brackets 140 are slidably disposed in the two sliding brackets 130 respectively and fixed to the second body 220. Each of the two elastic modules 150 is disposed between the respective sliding bracket 130 and the respective second bracket 140.

Figure 3A:
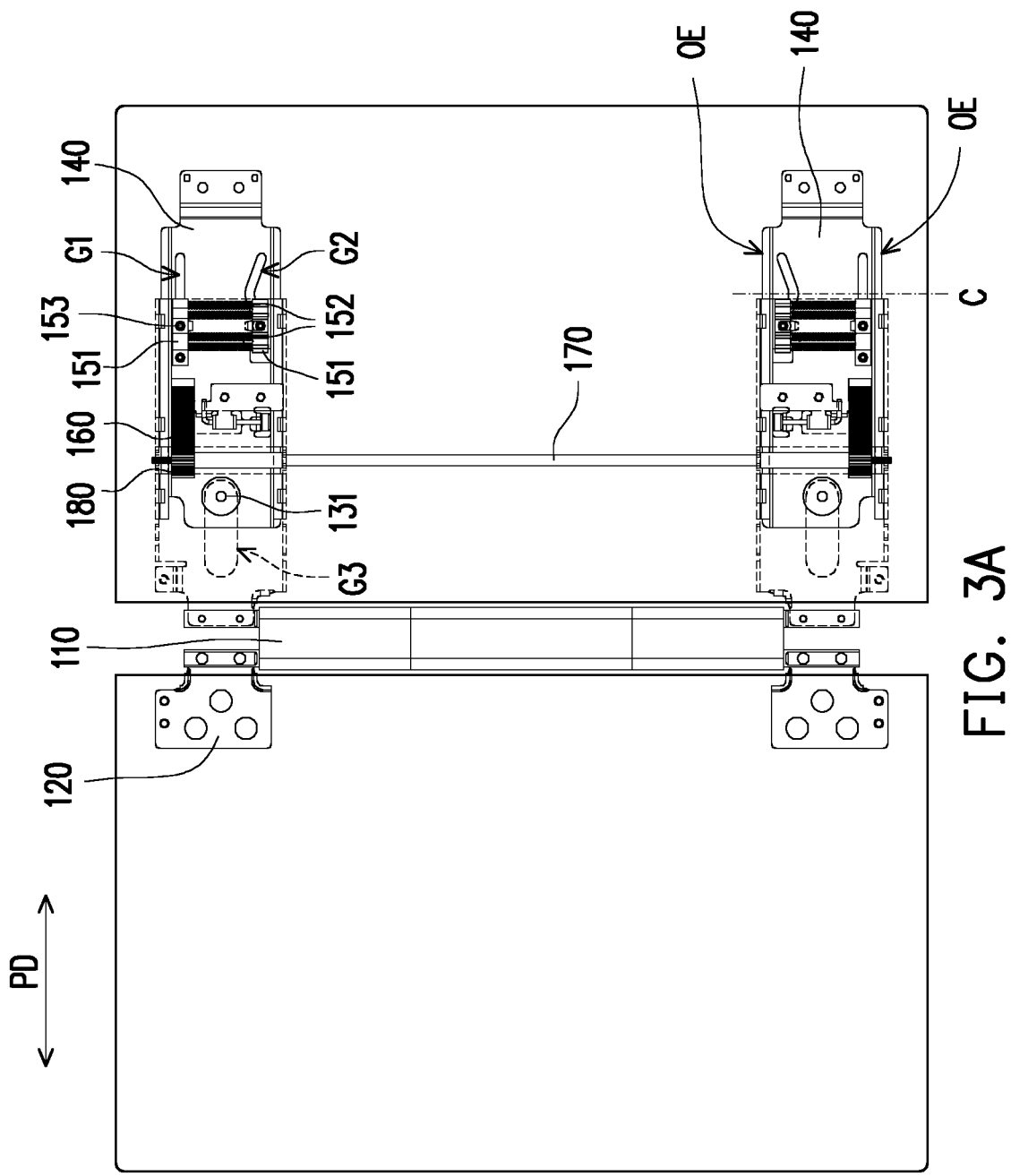
FIG. 3A is a schematic top view of the electronic device of FIG. 2B in the pulled-out state.
Figure 3B:
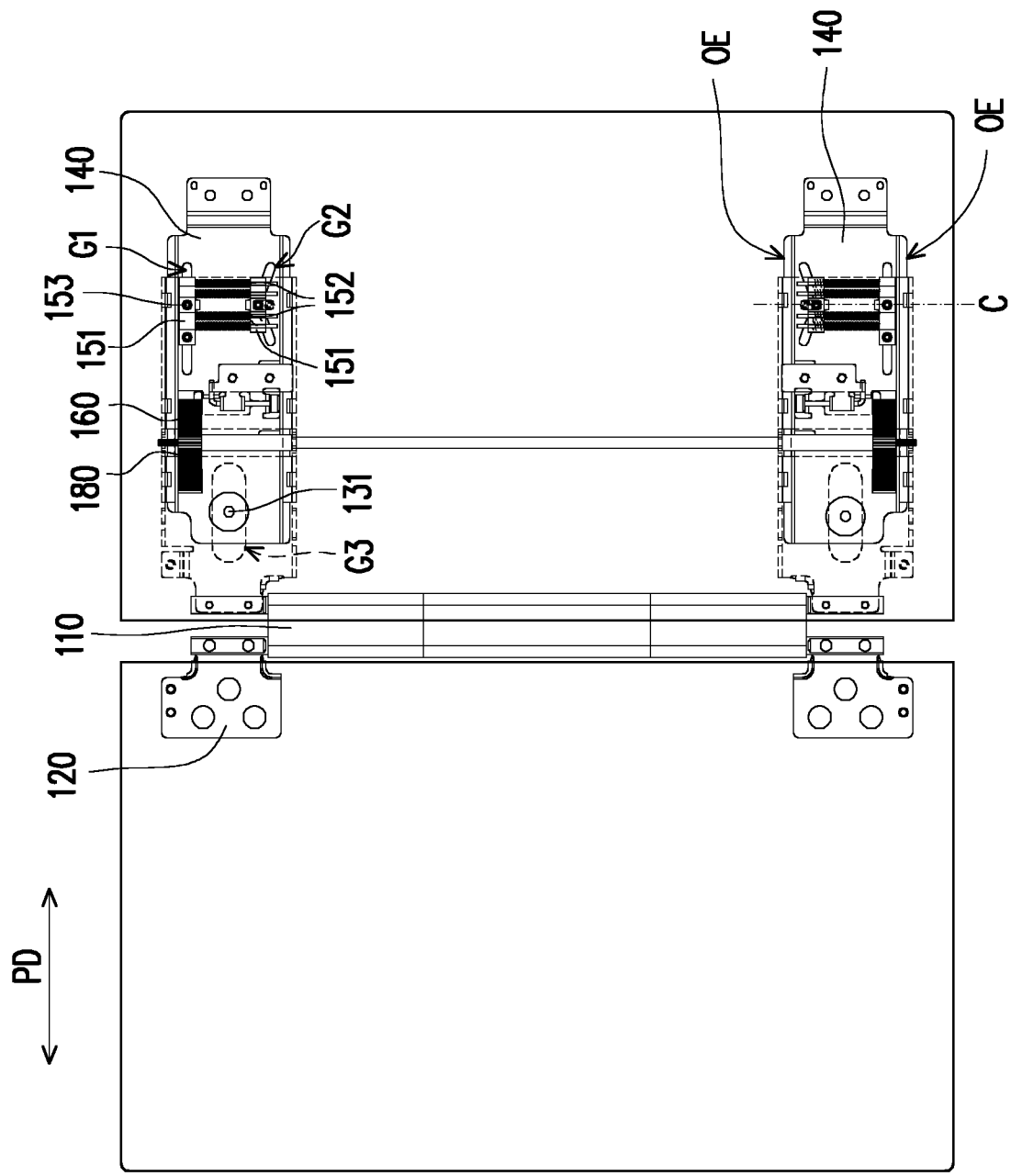
FIG. 3B is a schematic top view illustrating a switching operation of the electronic device of FIG. 3A.
Figure 3C:
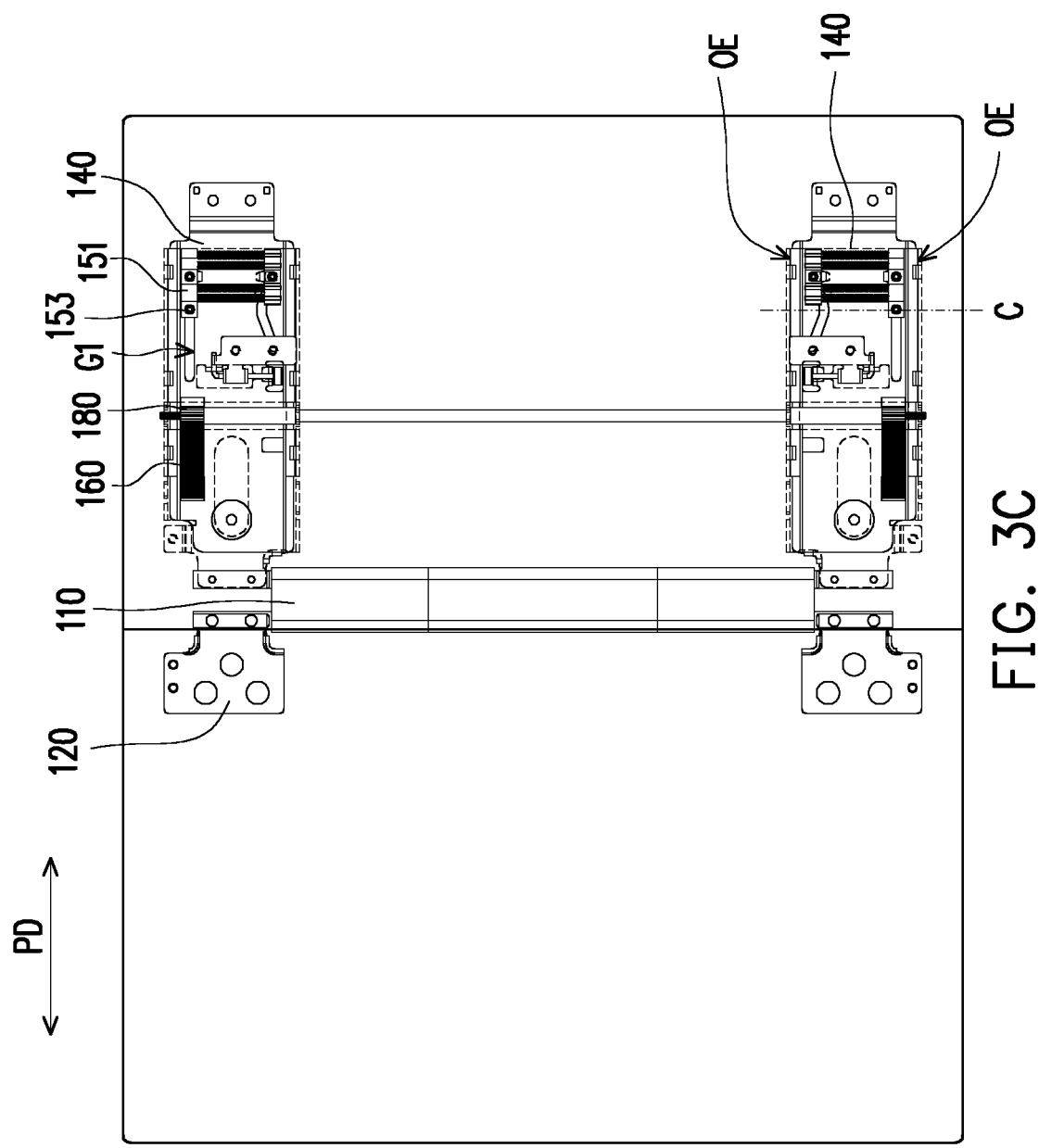
FIG. 3C is a schematic top view of the electronic device of FIG. 3B in the pushed-in state.

FIG. 3A is a schematic top view of the electronic device of FIG. 2B in the pulled-out state. FIG. 3B is a schematic top view illustrating a switching operation of the electronic device of FIG. 3A. FIG. 3C is a schematic top view of the electronic device of FIG. 3B in the pushed-in state.

Referring to FIG. 3A and FIG. 3C, the two sliding brackets 130 are adapted to synchronously slide with respect to the two second brackets 140, and each of the elastic modules 150 is configured to push the respective sliding bracket 130 and the respective second bracket 140 to form the pulled-out state or the pushed-in state. In the pulled-out state, the two first brackets 120 and the two sliding brackets 130 are adapted to rotate relative to the torque module 110 to be folded to each other (referring to FIG. 3A) or unfolded from each other (referring to FIG. 3C).

More specifically, each of the sliding brackets 130 has two sliding rails OB, disposed opposite to each other on a bottom surface of the sliding bracket 130. Each of the second brackets 140 has two sliding portions 141, respectively disposed on two opposite outer edges OE of the respective second bracket 140. The two sliding rails OB of each of the sliding brackets 130 respectively accommodate the two sliding portions 141 of the respective second bracket 140 so that the respective sliding bracket 130 and the respective second bracket 140 are adapted to slide with respect to each other by a combination of the sliding portions 141 and the sliding rails OB. In other embodiments, the same relative sliding effect of a concave-convex fit may also be achieved by disposing the sliding portions 141 on, for example, the sliding brackets 130 and disposing the sliding rails OB on, for example, the second brackets 140.

The following description refers to FIG. 1B, FIG. 2A and FIG. 3A. In details, the torque module 110 includes a housing 111, two torque members 112, two first shafts 113 and two second shafts 114. The two torque members 112 are disposed in the housing 111. The two first shafts 113 are rotatably inserted to the two torque members 112, and the two first brackets 120 are respectively connected to the two first shafts 113. The two second shafts 114 are rotatably inserted to the two torque members 112 in parallel to the two first shafts 113. The two sliding brackets 130 are respectively connected to the two second shafts 114.

In brief, the first body 210 drives the two first brackets 120 and the two first shafts 113 to pivot relative to the housing 111. Here, the torque is generated between the first shafts 113 and the two torque members 112 through friction. The second body 220 drives the two second brackets 140, the two sliding brackets 130 and the two first second shafts 114 to pivot relative to the housing 111. Here, the torque is generated between the second shafts 114 and the two torque members 112 through friction, and positions of the first body 210 and the second body 220 may be fixed through the torque to prevent random rotations.

Referring to FIG. 2A and FIG. 2B, the first body 210 and the second body 220 may rotate relative to the expansion hinge 100 to be switched to the folded state to facilitate storage. The first body 210 and the second body 220 may also be switched to the unfolded state (FIG. 2B shows that the first body 210 and the second body 220 are unfolded from each other by 180 degrees). In other embodiments not illustrated, an opening angle range of the first body 210 and the second body 220 includes 0 to 360 degrees.

Referring to FIG. 1B and FIG. 3A, each of the second brackets 140 includes a straight groove G1 and a V-shape groove G2. Each of the elastic modules 150 includes two sliders 151, a plurality of elastic members 152 and a plurality of limiting pins 153. The two sliders 151 are respectively disposed on the straight groove G1 and the V-shape groove G2. Two ends of the elastic members 152 are connected between the two sliders 151. The limiting pins 153 are respectively inserted to the straight groove G1, the V-shape groove G2 and the two sliders 151 and fixed to the respective sliding brackets 130.

Referring to FIG. 3A and FIG. 3B, each of the sliding brackets 130 is adapted to slide with respect to the respective second bracket 140 in a horizontal direction PD, and drive the two sliders 151 through the limiting pins 153. Here, one of the limiting pins 153 and one of the sliders 151 slide along the straight groove G1. Another one of the limiting pins 153 and another one of the sliders 151 slide along the V-shape groove G2. Since the V-shape groove G2 has a path trajectory gradually approaching the straight groove G1, when sliding in the V-shape groove G2, said another one of the limiting pins 153 will drive said another one of the slider 151 to be relatively close to said one of the sliders 151. When the two sliders 151 are located at a center C of the V-shape groove G2 and the straight groove G1, the two sliders 151 are relatively close to each other to compress the elastic members and accumulate the elastic force.

More specifically, when the two sliders 151 pass through the center C, the elastic members 152 are elastically restored to drive the two sliders 151 to move relatively away from each other and slide to one end of the V-shape groove G2 and the straight groove G1 such that an overlapping area of the respective sliding bracket 130 and the respective second bracket 140 is reduced to form the pulled-out state (referring to FIG. 3A), or the overlapping area of the respective sliding bracket 130 and the respective second bracket 140 is increased to form the pushed-in state (referring to FIG. 3C).

In detail, referring to FIG. 2B and FIG. 2C, when the respective sliding bracket 130 and the respective second bracket 140 form the pulled-out state, a distance D exists between the first body 210 and the second body 220, and the torque module 110 is being pulled out between the first body 210 and the second body 220. The first body 210 and the second body 220 are adapted to rotate relative to the torque module 110 to be folded to each other or unfolded from each other. When the respective sliding bracket 130 and the respective second bracket 140 form the pushed-in state, the torque module 110 enters the second body 220 so that the first body 210 and the second body 220 abut each other. In this way, the first body 210 and the second body 220 may be integrated as one and used to synchronously output images.

In addition, an automatic sliding speed of the elastic members 152 along the V-shape groove G2 may be adjusted by different slopes of the V-shape groove G2. According to the characteristics of the elastic members 152, the released elastic force can drive the limiting pin pins 153 to slide along the V-shape groove G2 and the straight groove G1, respectively. Then, the elastic members 152 are gradually elastically restored to the original state so the two sliders 151 are gradually away from each other, and eventually drive the sliding bracket 130 and the torque module 110 to be automatically hidden inside the second body 220. In an opposition direction, the elastic members 152 are gradually elastically restored to the original state so the two sliders 151 are gradually away from each other, and eventually drive the sliding bracket 130 and the torque module 110 to be automatically pulled outside the second body 220.

Referring to FIG. 1A, FIG. 2B and FIG. 2C, two racks 160, a linkage rod 170 and two linkage gears 180 are further included. The two racks 160 are respectively disposed on a top surface TS of the two second brackets 140 facing the two sliding brackets 130. The linkage rod 170 is pivotally connected to the two sliding brackets 130, and the two linkage gears 180 are slipped onto two ends of the linkage rod 170 and respectively meshed with the two racks 160. In details, each of the sliding brackets 130 has a through hole TH penetrating the top surface TS and a bottom surface of each of the sliding brackets 130 to partially expose the respective rack 160. Here, each the two ends of the linkage rod 170 is aligned with the respective through hole TH, and each of the linkage gears 180 partially penetrates the respective through hole TH to be meshed with the respective rack 160. More specifically, by combining the two sliding brackets 130 through the linkage rod 170, when the two sliding brackets 130 slide with respect to the two second brackets 140, the two sliding brackets 130 can synchronous operate in the sliding process through a meshing relationship between the racks 160 and the gears 180 to avoid a mutual offset between the first body 210 and the second body 220.

Referring to FIG. 1A, FIG. 3A to FIG. 3C, each of the sliding brackets 130 has a guiding groove G3 and a guiding pillar 131. The guiding groove G3 penetrates the top surface TS and the bottom surface of the respective sliding bracket 130. The guiding pillar 131 is inserted to the guiding groove G3 and secured to the respective the second bracket 140. When each of the sliding brackets 130 slides with respect to the respective second bracket 140, the respective guiding pillar 131 is adapted to relatively move in the respective guiding groove G3. More specifically, the guiding groove G3 is configured to limit a sliding distance of the guiding pillar 131 to prevent each of the sliding brackets 130 from being separated from the respective second bracket 140.

Figure 4A:
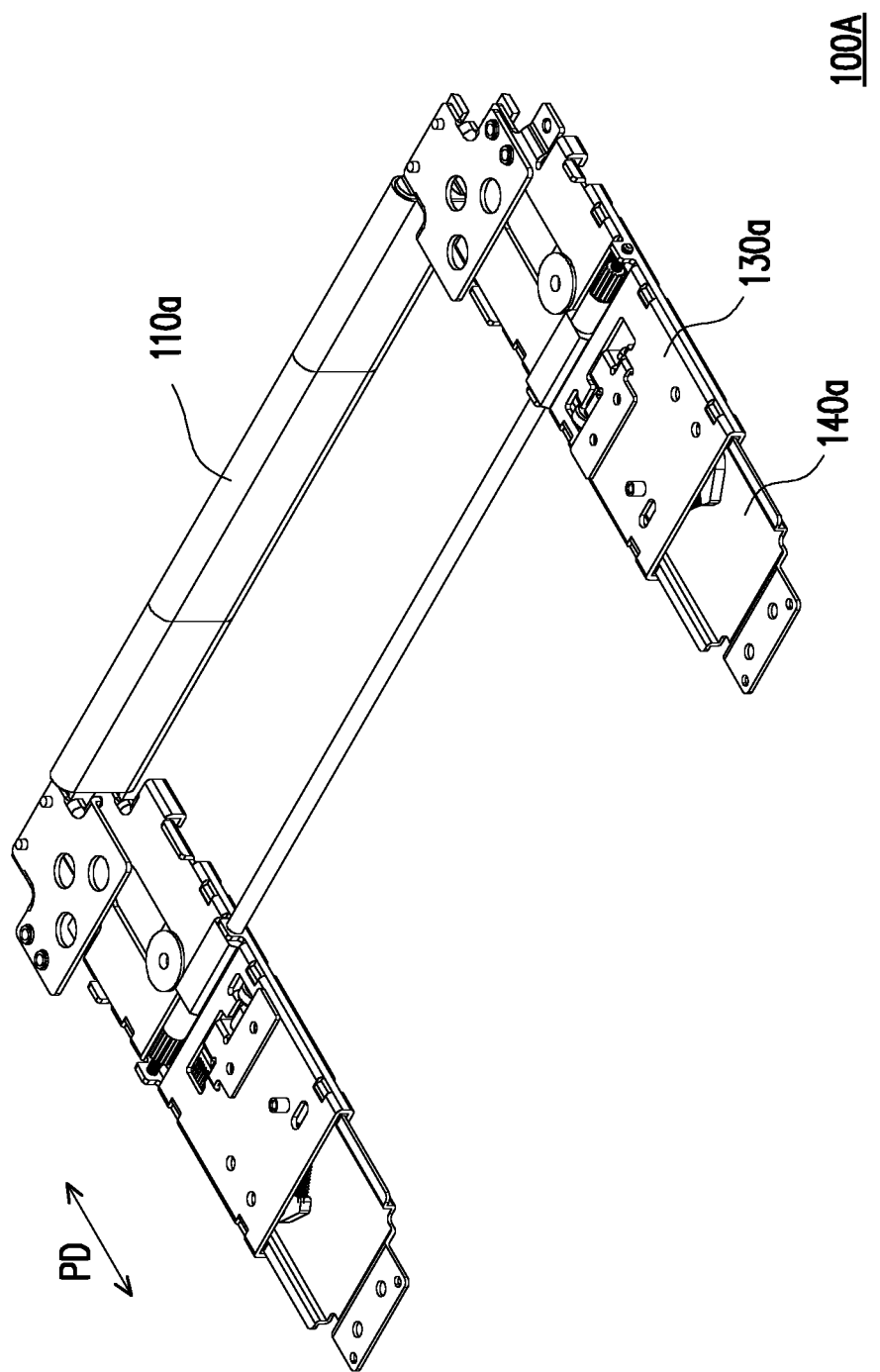
FIG. 4A is a three-dimensional view of an expansion hinge in another embodiment of the invention.
Figure 4B:
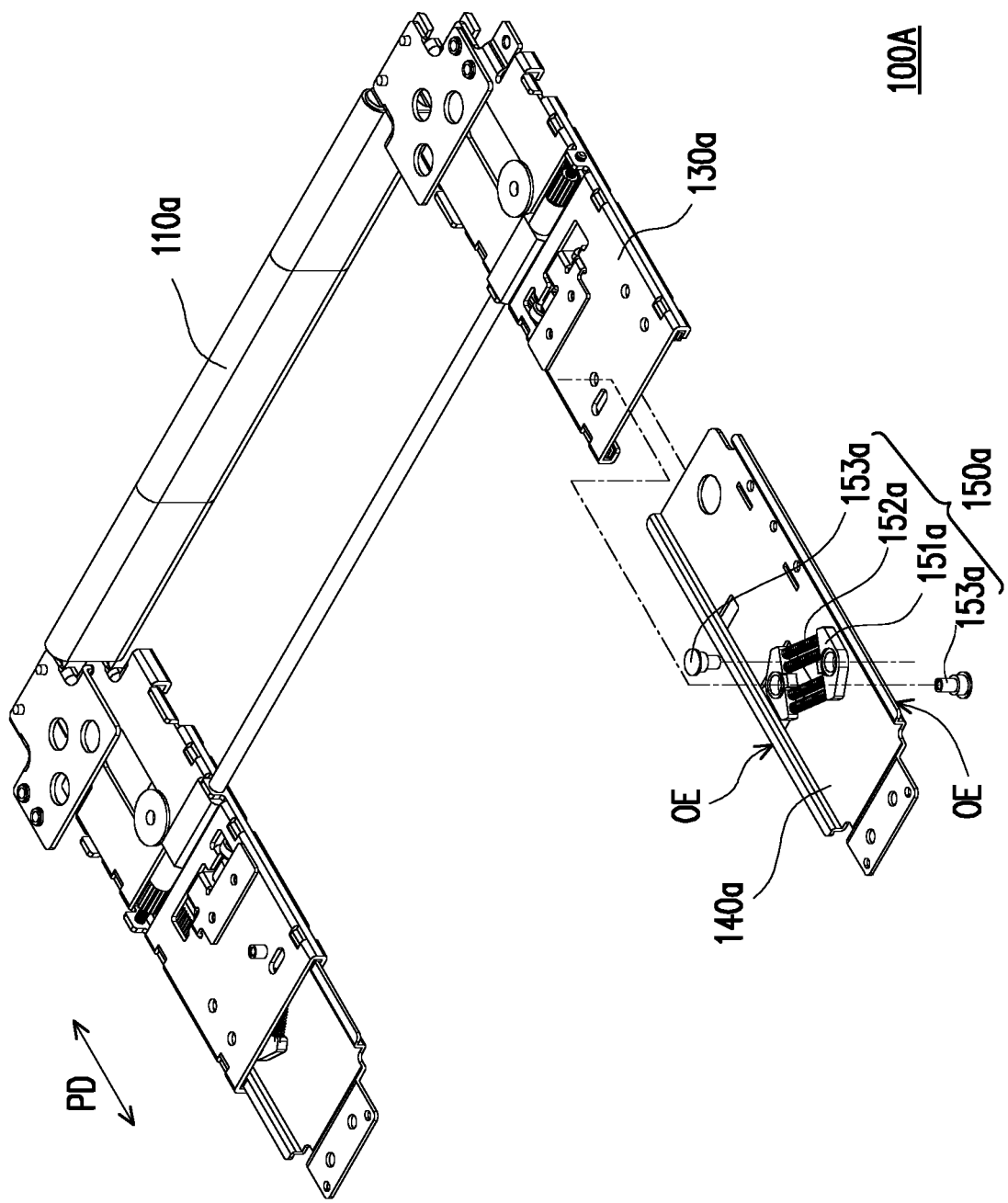
FIG. 4B is a schematic explosion view of certain elements in the expansion hinge of FIG. 4A.
Figure 5A:
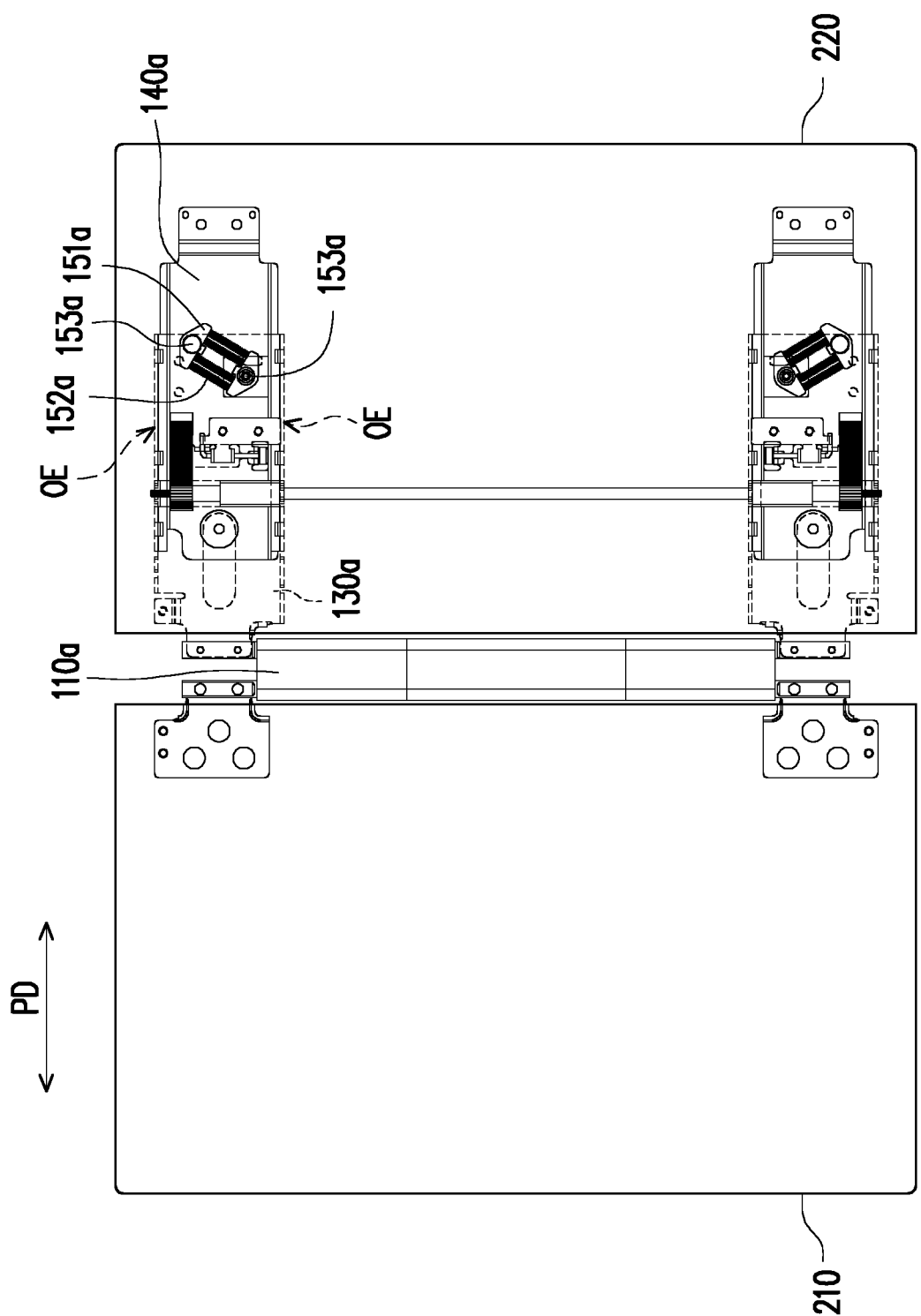
FIG. 5A is a schematic top view of the electronic device adopting the expansion hinge of FIG. 2B in the pulled-out state.
Figure 5B:
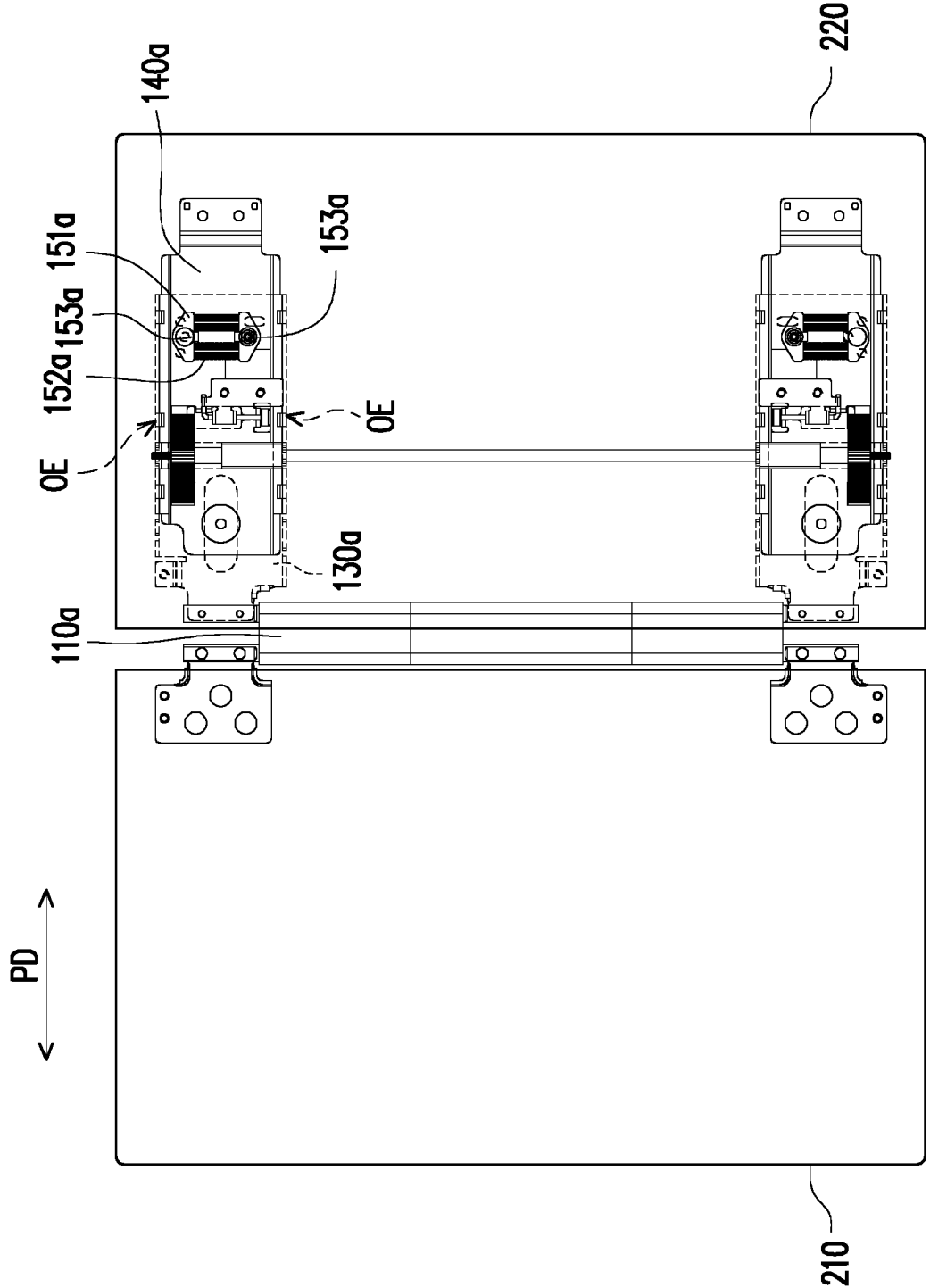
FIG. 5B is a schematic top view illustrating a switching operation of the electronic device of FIG. 5A.

FIG. 4A is a three-dimensional view of an expansion hinge in another embodiment of the invention. FIG. 4B is a schematic explosion view of certain elements in the expansion hinge of FIG. 4A. FIG. 5A is a schematic top view of the electronic device adopting the expansion hinge of FIG. 2B in the pulled-out state. FIG. 5B is a schematic top view illustrating a switching operation of the electronic device of FIG. 5A. FIG. 5C is a schematic top view illustrating the electronic device of FIG. 5B in the pushed-in state.

Referring to FIG. 4A and FIG. 4B, an expansion hinge 100A of the present embodiment is similar to the expansion hinge 100A of FIG. 1A, and is different in that the expansion hinge 100A has two elastic modules 150a.

Each of the elastic modules 150a includes two sliders 151a, a plurality of elastic members 152a and two limiting pins 153a. The two sliders 151a are disposed between the respective sliding bracket 130a and the respective second bracket 140a. Two ends of the elastic members 152a are connected between the two sliders 151a. One of the limiting pins 153a is inserted to one of the sliders 151a and fixed to the respective sliding bracket 130a, and another one of the limiting pins 153a is inserted to another one of the sliders 151a and fixed to the respective second bracket 140a.

Referring to FIG. 5A to FIG. 5C, each of the sliding brackets 130a is adapted to slide with respect to the respective second bracket 140a in a horizontal direction PD, and drive the two sliders 151a through the limiting pins 153a to generate a relative pivoting (for instance, when one of the sliders 151a rotates clockwise, the other one of the sliders 151a rotates counterclockwise), so as to achieve a relative sliding for the sliding brackets 130a and the second brackets 140a. Referring to FIG. 5B, when the two sliders 151a are respectively parallel to two opposite outer edges OE of the respective second bracket 140a (which means that a distance between the two sliders 151a is the closest), the two sliders 151a are relatively close to each other to compress the elastic members 152a.

When the two sliders 151a are diagonally aligned with the two opposite outer edges OE of the respective second bracket 140a (which means that the distance between the two sliders 151a is the farthest), the elastic members 152a are elastically restored to drive the two sliders 151a to move relatively away from each other such that an overlapping area of the respective sliding bracket 130a and the respective second bracket 140a is reduced to form the pulled-out state, or the overlapping area of the respective sliding bracket 130a and the respective second bracket 140a is increased to form the pushed-in state.

In detail, referring to FIG. 5A to FIG. 5C, when the respective sliding bracket 130a and the respective second bracket 140a form the pulled-out state, a distance D exists between the first body 210 and the second body 220, and the torque module 110a is being pulled out between the first body 210 and the second body 220. When the respective sliding bracket 130a and the respective second bracket 140a form the pushed-in state, the torque module 110a enters the second body 220 so that the first body 210 and the second body 220 abut each other. In this way, the first body 210 and the second body 220 may be integrated as one and used to synchronously output images.

In summary, the expansion hinge of the invention utilizes the elastic force released by the two elastic modules during elastic recovery as the auxiliary pushing force, so that the two sliding brackets and the two second brackets have the semi-automatic sliding effect. Then, after the elastic modules are elastically restored, each of the elastic modules is configured to push the respective sliding bracket and the respective second bracket to form the pulled-out state or the pushed-in state of the expansion hinge.

Furthermore, the expansion hinge of the invention is adapted to connect the first body and the second body of the electronic device for outputting images. In the pulled-out state of the expansion hinge, the first body and the second body can rotate relative to the expansion hinge to be folded to each other or unfolded from each other. When the first body and the second body are unfolded from each other by 180 degrees, the two sliding brackets can synchronously slide with respect to the two second brackets by the external force so that the expansion hinge is switched to the pushed-in state. As a result, the torque module can be hidden inside the second body so that the first body and the second body abut each other to reduce the spacing therebetween, and thereby achieve the more preferable viewing effect and the improved appearance for the electronic device.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. An expansion hinge, comprising:
   a torque module, configured to provide torques;
   two first brackets, rotatably connected to two respective opposite ends of the torque module;
   two sliding brackets, rotatably connected to the two respective opposite ends of the torque module;
   two second brackets, slidably disposed in the two sliding brackets respectively; and
   two elastic modules, each of which is disposed between the respective sliding bracket and the respective second bracket,
   wherein the two sliding brackets are adapted to synchronously slide with respect to the two second brackets, and each of the elastic modules is configured to push the respective sliding bracket and the respective second bracket to form a pulled-out state or a pushed-in state, and the two first brackets and the two sliding brackets are adapted to rotate relative to the torque module to be folded to each other or unfolded from each other in the pulled-out state,
   wherein an overlapping area of the respective sliding bracket and the respective second bracket is reduced to form the pulled-out state, or the overlapping area of the respective sliding bracket and the respective second bracket is increased to form the pushed-in state.

2. The expansion hinge according to claim 1, wherein each of the second brackets comprises a straight groove and a V-shape groove, each of the elastic modules comprises two sliders, a plurality of elastic members and a plurality of limit g pins, the two sliders are respectively disposed on the straight groove and the V-shape groove, two ends of the elastic members are connected between the two sliders, and the limiting pins are respectively inserted to the straight groove, the V-shape groove and the two sliders and fixed to the respective sliding brackets.

3. The expansion hinge according to claim 2, wherein each of the sliding brackets is adapted to slide with respect to the respective second bracket in a horizontal direction, and drive the two sliders through the limiting pins, wherein one of the limiting pins slides along the straight groove, another one of the limiting pins slides along the V-shape groove, and the two sliders are relatively close to each other to compress the elastic members when the two sliders are located at a center of the V-shape groove and the straight groove.

4. The expansion hinge according to claim 3, wherein when the two sliders pass through the center, the elastic members are elastically restored to drive the two sliders to move relatively away from each other and slide to one end of the V-shape groove and the straight groove such that the overlapping area of the respective sliding bracket and the respective second bracket is reduced to form the pulled-out state, or the overlapping area of the respective sliding bracket and the respective second bracket is increased to form the pushed-in state.

5. The expansion hinge according to claim 1, further comprising:
   two racks, a linkage rod and two linkage gears, the two racks being respectively disposed on a top surface of the two second brackets facing the two sliding brackets, the linkage rod being pivotally connected to the two sliding brackets, and the two linkage gears being slipped onto two ends of the linkage rod and respectively meshed with the two racks.

6. The expansion hinge according to claim 5, wherein each of the sliding brackets has a through hole penetrating the top surface and the bottom surface of the respective sliding bracket to partially expose the respective rack, each of the two ends of the linkage rod is aligned with the respective through hole, and each of the linkage gears partially penetrates the respective through hole to be meshed with the respective rack.

7. The expansion hinge according to claim 1, wherein each of the sliding brackets has a guiding groove and a guiding pillar, the guiding groove penetrates the top surface and the bottom surface of the respective sliding bracket, the guiding pillar is inserted to the guiding groove and secured to the respective second bracket, and when each of the sliding brackets slides with respect to the respective second bracket, the respective guiding pillar is adapted to relatively move in the respective guiding groove.

8. The expansion hinge according to claim 1, wherein each of the sliding brackets has two sliding rails, disposed opposite to each other on a bottom surface of the sliding bracket, each of the second brackets has two sliding portions, respectively disposed on two opposite outer edges of the respective second bracket, and the two sliding rails of each of the sliding brackets respectively accommodate the two sliding portions of the respective second bracket so that the respective sliding bracket and the respective second bracket are adapted to slide with respect to each other.

9. The expansion hinge according to claim 1, wherein each of the elastic modules comprises two sliders, a plurality of elastic members and two limiting pins, the two sliders are disposed between the respective sliding bracket and the respective second bracket, two ends of the elastic members are connected between the two sliders, and wherein one of the limiting pins is inserted to one of the sliders and fixed on the respective sliding bracket, and another one of the limiting pins is inserted to another one of the sliders and fixed to the respective second bracket.

10. The expansion hinge according to claim 9, wherein each of the sliding brackets is adapted to slide with respect to the respective second bracket in a horizontal direction, and drive the two sliders through the limiting pins to generate a relative pivoting, and when the two sliders are respectively parallel to two opposite outer edges of the respective second bracket, the two sliders are relatively close to each other to compress the elastic members.

11. The expansion hinge according to claim 10, wherein when the two sliders are diagonally aligned with the two opposite outer edges of the respective second bracket, the elastic members are elastically restored to drive the two sliders to move relatively away from each other, and such that the overlapping area of the respective sliding bracket and the respective second bracket is reduced to form the pulled-out state, or the overlapping area of the respective sliding bracket and the respective second bracket is increased to form the pushed-in state.

12. The expansion hinge according to claim 1, wherein the torque module comprising:
a housing;
two torque members, disposed in the housing;
two first shafts, rotatably inserted to the two torque members, the two first brackets being respectively connected to the two first shafts; and
two second shafts, rotatably inserted to the two torque members in parallel to the two first shafts, the two sliding brackets being respectively connected to the two second shafts.

13. An electronic device, comprising:
a first body;
a second body; and
an expansion hinge, disposed on the first body and the second body, and comprising:
a torque module, configured to provide torques;
two first brackets, rotatably connected to two respective opposite ends of the torque module and fixed to the first body;
two sliding brackets, rotatably connected to the two respective opposite ends of the torque module;
two second brackets, slidably disposed in the two sliding brackets respectively and fixed to the second body; and
two elastic modules, each of which is disposed between the respective sliding bracket and the respective second bracket,
wherein the two sliding brackets are adapted to synchronously slide with respect to the two second brackets, and each of the elastic modules is configured to push the respective sliding bracket and the respective second bracket to form a pulled-out state or a pushed-in state, and in the pulled-out state, the torque module is being pulled out between the first body and the second body so that a distance exists between the first body and the second body, and the first body and the second body are adapted to rotate relative to the torque module to be folded to each other or unfolded from each other, and in the pushed-in state, the torque module enters the second body so that the first body and the second body abut each other,
wherein an overlapping area of the respective sliding bracket and the respective second bracket is reduced to form the pulled-out state, or the overlapping area of the respective sliding bracket and the respective second bracket is increased to form the pushed-in state.

* * * * *